United States Patent [19]
Lenz

[11] Patent Number: 4,599,894
[45] Date of Patent: Jul. 15, 1986

[54] METHOD AND APPARATUS TO SHIELD AN AIR FLOW RATE METER DISPOSED IN THE INTAKE TUBE OF AN INTERNAL COMBUSTION ENGINE FROM AIR COLUMN FLUCTUATIONS

[75] Inventor: Hans P. Lenz, Vienna, Austria

[73] Assignee: Robert Bosch GmbH, Stuttgart, Fed. Rep. of Germany

[21] Appl. No.: 712,067

[22] Filed: Mar. 15, 1985

[30] Foreign Application Priority Data

May 9, 1984 [DE] Fed. Rep. of Germany ....... 3417051

[51] Int. Cl.⁴ ............................................. G01M 15/00
[52] U.S. Cl. .......................................... 73/118; 73/204
[58] Field of Search ................. 73/118, 204, 199, 275; 123/478, 494

[56] References Cited
U.S. PATENT DOCUMENTS

4,104,915  8/1978  Husse ................................. 73/118 X
4,311,042  1/1982  Hosoya et al. ........................ 73/118

Primary Examiner—Jerry W. Myracle
Attorney, Agent, or Firm—Edwin E. Greigg

[57] ABSTRACT

A method and apparatus for shielding an air flow rate meter, in particular a hot wire air flow rate meter, or protecting it, from air column fluctuations in the intake tube on an internal combustion engine arising from the non-uniform aspiration of air by the engine. Before the air flow rate meter as viewed from the inlet valve area of the intake tube, elastic diaphragm means are disposed such that they form an interior chamber in the intake tube which is sealed off from the atmosphere on the one hand, yet is embodied such that a virtually constant pressure, which corresponds to atmospheric pressure, can be maintained in it. As a result, pressure waves arriving from the intake tube are absorbed prior to contact with the air flow rate meter and transmitted in terms of their energetic effects to the ambient air, so that the air flow rate meter is uncoupled from the air column fluctuations in the intake tube that are generated by the engine.

15 Claims, 8 Drawing Figures

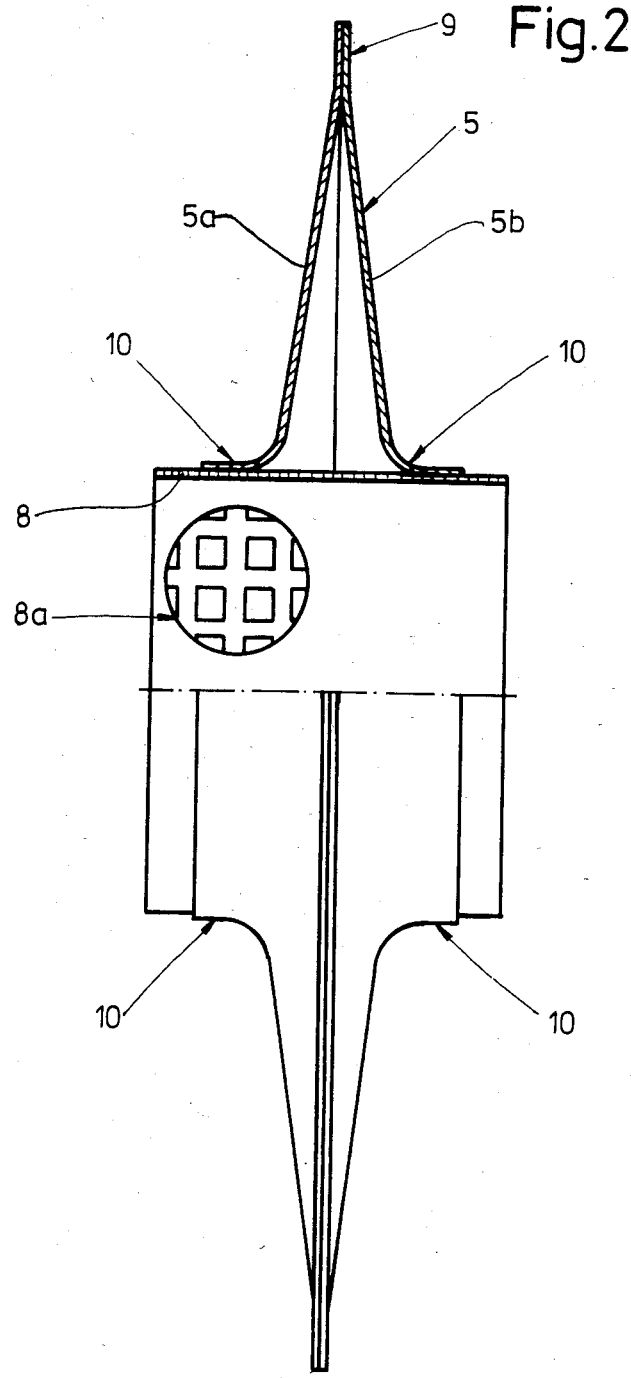

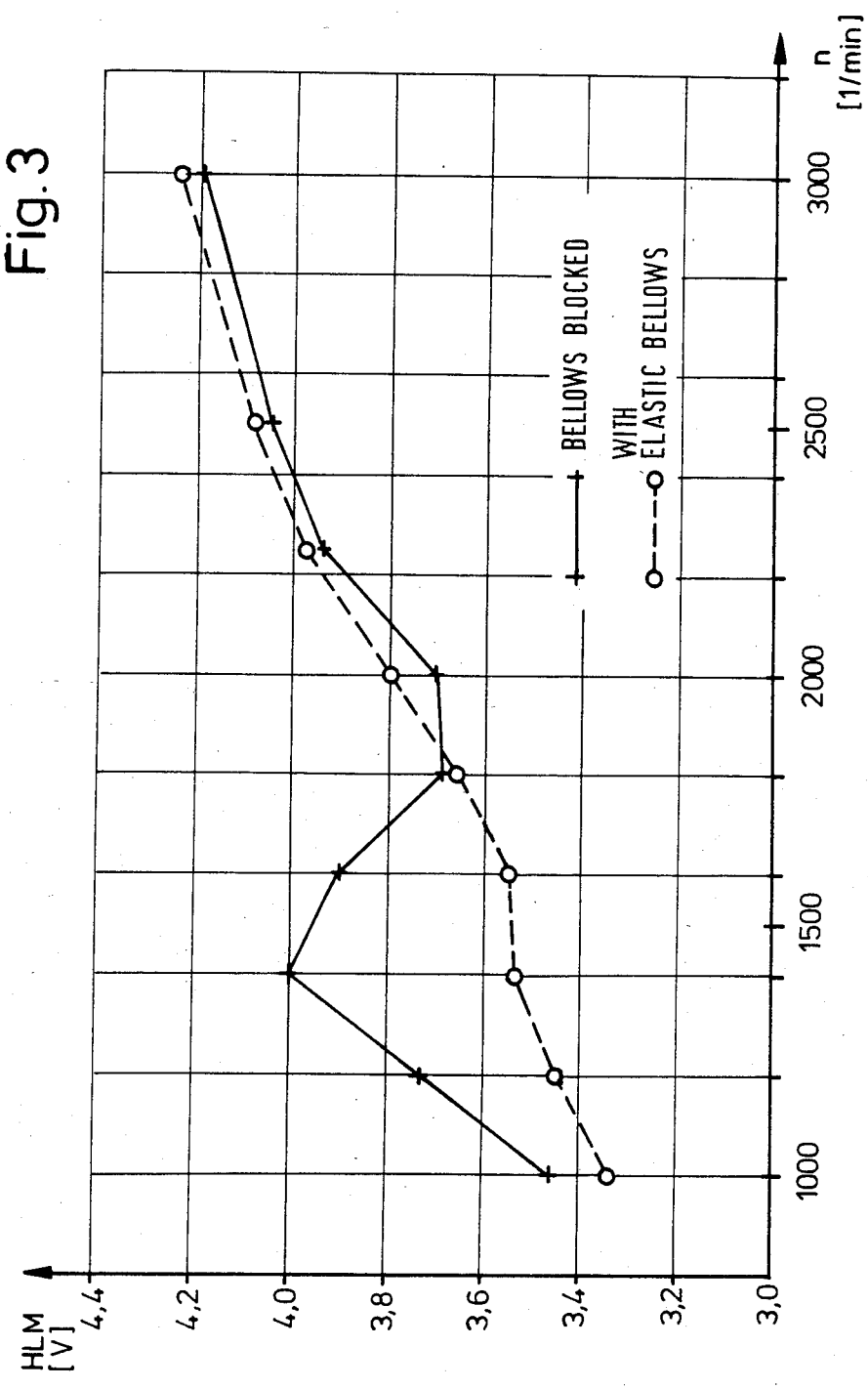

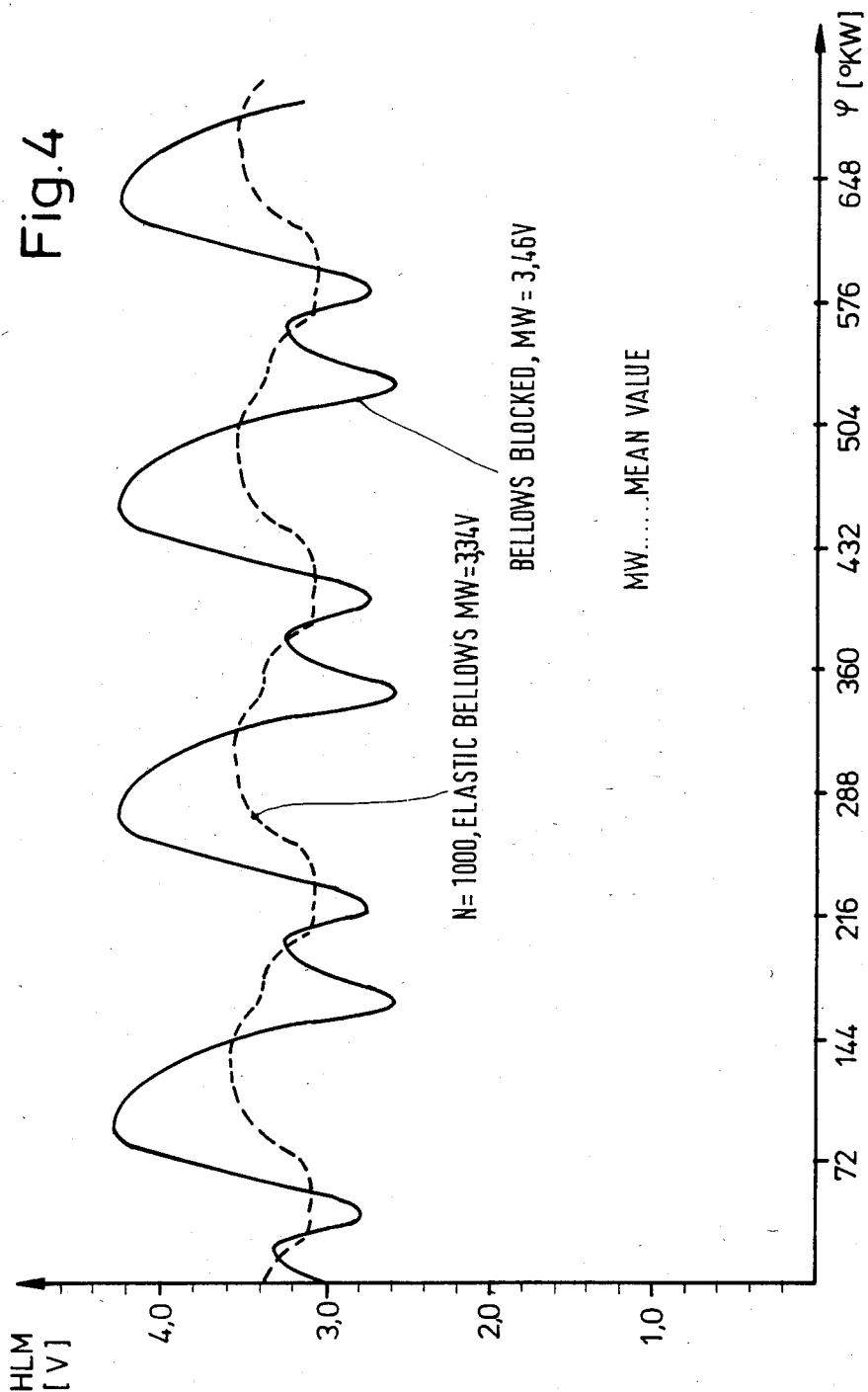

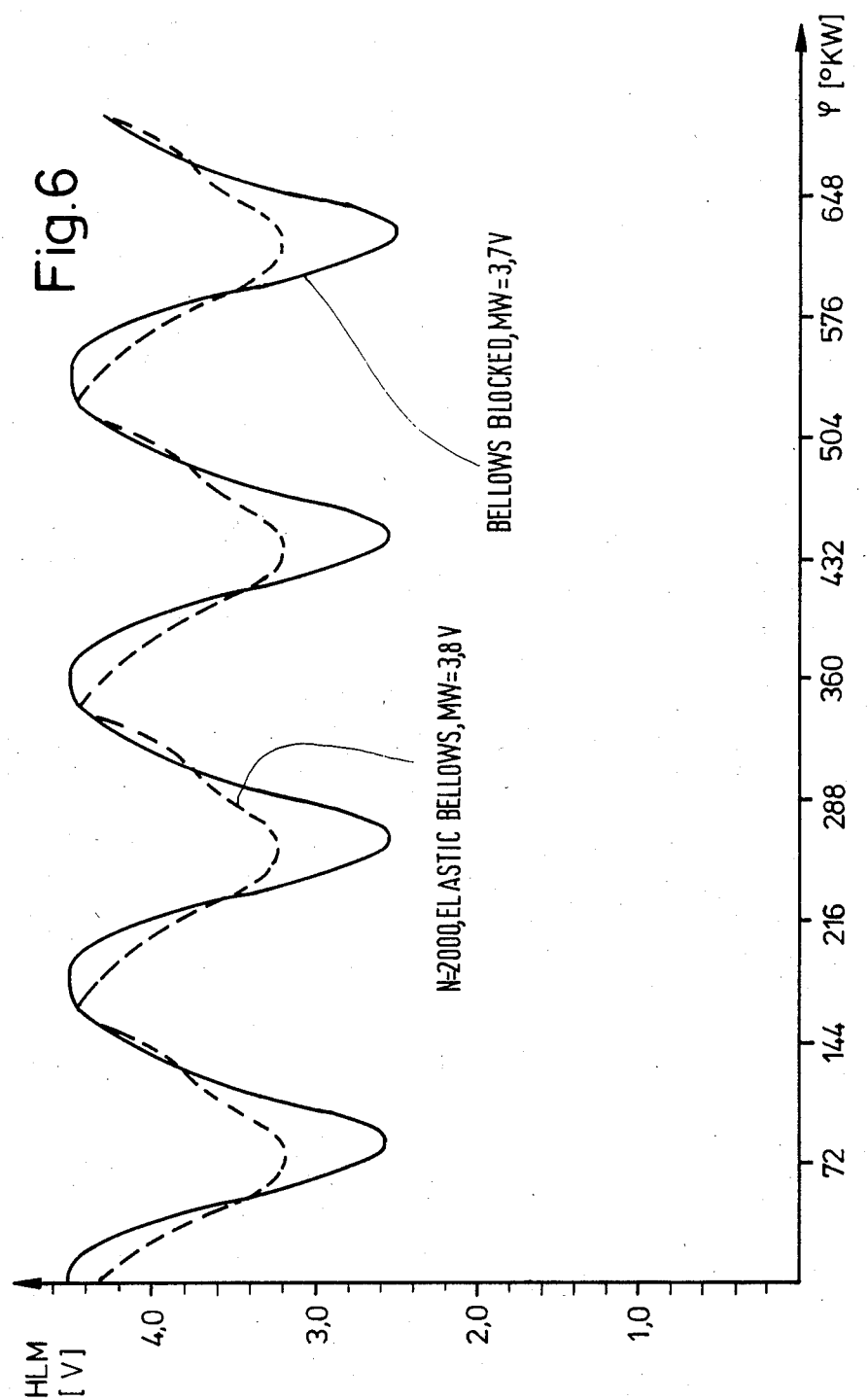

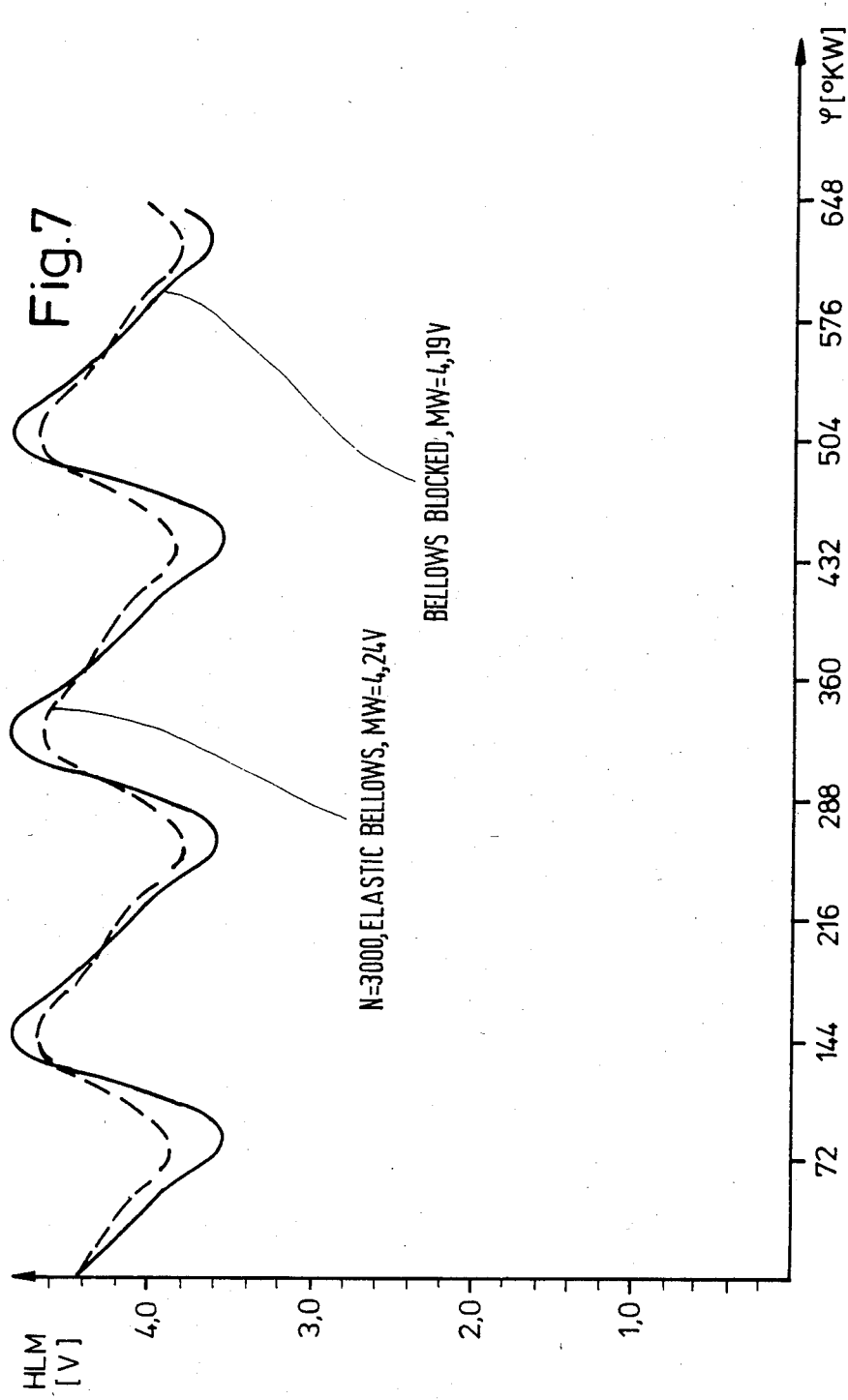

METHOD AND APPARATUS TO SHIELD AN AIR FLOW RATE METER DISPOSED IN THE INTAKE TUBE OF AN INTERNAL COMBUSTION ENGINE FROM AIR COLUMN FLUCTUATIONS

BACKGROUND OF THE INVENTION

It is well known that internal combustion engines embodied as piston engines cannot aspirate the air quantities required for combustion in their cylinders uniformly through the intake tube, but in fact can only do so nonuniformly, because during the compression, combustion and expulsion strokes (in this case, referring to a four-stroke engine) the inlet valve remains closed, so that the transportation of the air quantities through the intake tube is interrupted. Depending on the number of cylinders of the engine, pulsations or fluctuations occur in the air column in the intake tube. Not infrequently, these fluctuations have a positive supercharging effect, for which the air intake system, and the exhaust manifold adapted to it, may even be intentionally designed; nevertheless, these fluctuations necessarily become a problem if, superimposed on the intake process, they cause an inaccurate signal to be furnished by measuring devices which are supposed to ascertain the air throughput through the intake tube.

Since the fuel must be distributed to engines by a mixture former in proportion with the quantity of air aspirated, measuring or determining the aspirated air quantity is necessary in order finally to obtain an electrical or mechanical indication of the quantity of air aspirated, or at least required, by the engine at a given moment. In the connection, mixture formers such as fuel injection systems and the like are known, which ascertain the aspirated air quantity by measuring the pressure in the intake tube or use air flow rate meters primarily comprising mechanical components, which for instance control a quantity distributor for the fuel metering via a baffle plate articulatedly supported in the intake tube, by means of the baffle plate deflection effected under the influence of the air masses flowing past it (Bosch K-Jetronic).

The following discussion of the subject of air flow rate measurement, taking into account air column fluctuations in the intake tube, encompasses the disposition of a hot wire flow rate meter in the intake tube which furnishes an indication, or reading, that is as closely proportional as possible to the aspirated air quantity. It is to be understood, however, that this discussion is equally valid for any other air flow rate meters with which similar problems arise because of the fluctuation of the air column in the intake tube. Specifically, if the air flow rate meter uses a hot wire, then the aspirated air column, oscillating back and forth, leads to an inaccurate air throughput reading, because the hot wire flow rate meter is incapable of distinguishing between air masses which flow from the intake tube inlet toward the engine and masses which undergo a movement impetus in the opposite direction because of a brief reverse flow or pulsation. The necessary, system-dictated result, caused by this fluctuation or oscillation of the air column back and forth, is that a multiple reading is produced for one and the same mass of air. Thus an incorrect fuel enrichment cannot be entirely precluded, at least for specific operating conditions such as full load at low rpm, because a greater air throughout may be indicated than actually exists. This may cause tuning problems in the entire system.

OBJECT OF THE INVENTION

It is accordingly the object of the invention to devise a method and an apparatus with which the air column fluctuation in the intake tube resulting from the nonuniform aspiration action of an internal combustion engine can be affected in such a manner that air flow rate meters reacting to such fluctuations with an error inherent in the system are no longer influenced in such a way as to render their output signal inaccurate, at least in certain rpm and operating parameter ranges such as idling, partial load and full load.

SUMMARY OF THE INVENTION

The method and apparatus according to the invention for protecting against air column fluctuations in the intake tube of an internal combustion engine attain this object as provided by the invention and have the advantage that for practical operation with satisfactory accuracy, a virtually linear display which is practically proportional to the actual air throughput is attained on the part of whatever flow rate meter (hot wire flow rate meter) is used, without having to provide complicated linearizing and compensating devices for the meter. The invention in fact succeeds in virtually making air column fluctuations disappear, even in critical rpm and load ranges of the engine, or at least stabilizing them in terms of their effect on the air flow rate meter (hot wire flow rate meter) and keeping them from affecting the meter so that inaccurate measurements no longer occur. This protection against air column fluctuations, the occurrence of which could not be overcome heretofore is now made possible by this invention by means of the use of elastic means in the region of the intake tube located between the inlet valve area and the air flow rate meter. These elastic means are designed such that before the air flow rate meter, as seen from the standpoint of the engine, a chamber can be built up in which virtually constant (for instance, atmospheric) pressure can be maintained. This chamber absorbs disruptive oscillations and keeps them away from the air flow rate meter, without inducing delays in air flow rate meter response.

A further advantage of the invention is that it can be realized relatively simply, and the downstream intake line in the direction of the engine with respect to the air throughput measuring device is reliably separated from the air column fluctuations. In a preferred embodiment of the invention an elastic diaphragm or double diaphragm is disposed in the course of the intake tube which absorbs the pressure waves arriving from the intake tube and transmits the effects of these pressure waves to the ambient air; in this sense, the ambient air may be called a oscillation sump, which absorbs the pressure waves such that they have no further effect.

A particular advantage of the invention is that the axial diaphragm, in the form of a tubular corrugated hose, or a double radial diaphragm extending substantially in the radial direction, which absorbs the pressure waves is supported on or next to an intermediate pipe section of the intake tube comprising a grid tube; then the diameter of the double diaphragm is at least twice as large as the diameter of the intake tube.

It should be noted at this point that naturally it is known per se to diapose some elastic intermediate member in the course of the intake tube, which typically is a corrugated hose or the like made of a rubber-like material; however, this is done for a different reason and in a form which makes it impossible to maintain the constant pressure mentioned above for the sake of absorbing intake tube pressure waves at the point of separation, or partitioning. Such coupling bellows or hoses, in known internal combustion engines, and for instance in the K-Jetronic system mentioned earlier herein, serve to uncouple the engines, which not infrequently oscillate and vibrate forcefully at their rubber bearings, vibrationally from the lines leading to or from these engines, so that these lines, which lead to other stationary parts (for instance in the case of the K-Jetronic system to the baffle plate air flow rate meter with the associated mixture regulator and fuel quantity divider) will not break from material fatigue or transmit such vibrations, by means of their physical existence, via the tube walls as far as the vicinity of the baffle plate air flow rate meter, which can as a result be mechanically affected or even damaged, over a long period of time. The disposition of such mechanical uncoupling bellows between various areas of the engine of a motor vehicle, such as those also not infrequently disposed between the air filter and the carburetor, has nothing to do with the present invention.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 2 shows a preferred embodiment of the diaphragm means in the form of a double diaphragm;

FIG. 3 shows the influence of the elastic double diaphragm on the average output voltage of a hot wire flow rate meter used as the air flow rate meter;

FIGS. 4–7, in the form of diagrams, show the output voltage of the hot wire air flow rate meter (hot wire signal HLM) over the crankshaft angle of an internal combustion engine in one operating cycle, each in the form of two curve courses, one for when a double diaphragm is used and one without a double diaphragm (with the double diaphragm blocked) for the various rpm values of $n=1000$ min$^{-1}$, $n=1400$ min$^{-1}$, $n=2000$ min$^{-1}$ and $n=3000$ min$^{-1}$.

DESCRIPTION OF THE PREFERRED EMBODIMENTS

The basic concept of the present invention is to provide a partitioning location at a predetermined area in the course of the intake tube of an internal combustion engine between an air flow rate meter, which is preferably a hot wire flow rate meter, disposed at the input side and the inlet valve or valves and there to devise an area in which virtually a constant pressure, e.g., the pressure of the ambient atmosphere, is maintained, yet without this area being in direct open communication with the ambient atmosphere. Such an area is therefore in a position to absorb pressure waves arriving at the intake tube from the valve area and creating the known phenomenon of intake tube air column fluctuations, and to transmit the effects of these pressure waves to the ambient air and thus simultaneously to shield or protect the air flow rate meter (hot wire flow rate meter) detecting the air throughput in the form of an air quantity or flow rate.

Figure 1:
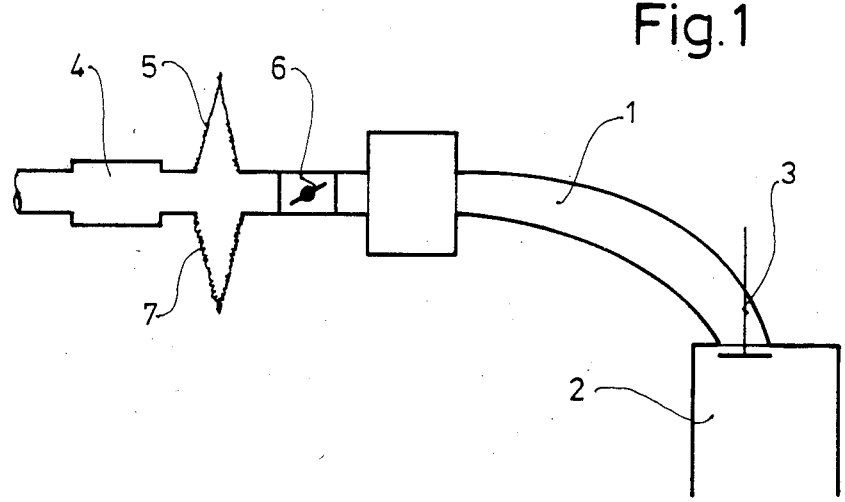
FIG. 1, in highly schematic form, shows the intake tube area of an internal combustion engine having diaphragm means disposed therein between the air flow rate meter and the throttle valve.

In FIG. 1, 2 indicates the internal combustion engine with its inlet valve 3; the engine aspirates combustion air through the intake tube 1 via the throttle valve 6, and in the course of the intake line an air flow rate meter 4 is disposed; in the illustrated embodiment, which is not to be considered limiting, this element is embodied as a hot wire air flow rate meter. Between the air flow rate meter 4 and the throttle valve 6, a region or chamber 7 is formed which with respect to the interior of the intake tube practically represents an atmospheric state and by way of which the intake tube pressure waves can impart their energy to the surrounding area. This chamber between the air flow rate meter 4 and the valve inlet area (it will be understood that this chamber may instead be disposed downstream of the throttle valve 6, or in other words between the throttle valve and the inlet valve area) may be formed by arbitrary means, preferably elastic diaphragm means, which are capable not only of completely sealing off the interior of the intake tube from the surroundings, or in other words form the ambient atmosphere, as required, so that the air flow rate meter 4 can accurately detect the air throughput, but also of maintaining a virtually constant pressure (that is, approximately atmospheric pressure) in this area inside the intake tube, with the opportunity of absorbing pressure waves from the intake tube and transmitting them to the surroundings or in other words to the outside and thus uncoupling the oscillation space, in which a pronounced fluctuation back and forth of the aspirated air column takes place, from the air flow rate meter. The elastic diaphragm material may therefore be a single or double diaphragm or some appropriately embodied piece of elastic tubing.

In the exemplary embodiment shown, a double diaphragm 5 is provided, comprising two opposed annular faces made of an elastic material, which are joined together at their outer circumference and which open to an increasing extent toward the inside. The annular faces each have a central bore or recess with which they are then secured to the sections of the intake tube facing them.

As a result, a sort of "breathability" is attained in the interior of intake tube system as compared with atmospheric pressure; as a result, the oscillating air column which begins at the inlet valve area in the intake tube cannot extend its fluctuations as far as the air flow rate meter 4, but rather only as far as the double diaphragm 5. The air flow rate meter is thus capable of registering the air aspirated during the intake process without hindrance, but it can no longer produce inaccurate output measurements because it is shielded from or uncoupled from the intake tube oscillations.

If the double diaphragms 5, the only type to be discussed below, is disposed between the throttle valve 6 and the continuing portion of the intake tube 1, then if the throttle valve is generally closed the diaphragm is generally compressed, as is readily apparent, because of the markedly negative intake tube pressures which then form in this area. However, this does not impair the effectiveness of the double diaphragm, since in these operating conditions, because of the generally closed throttle valve 6, the distruptive air column fluctuations are already substantially prevented from affecting the air flow rate meter anyway.

The preferred exemplary embodiment shown in FIG. 2 includes a grid tube section 8 supporting the double diaphragm at its outer circumference. This tube section 8 has recesses or perforations, for instance over its entire circumference, as shown in the enlargement depicted at 8a. This assures the firm retention of the double diaphragm 5 and also provides suitable opportunities for connecting the intake tube connection pieces leading away therefrom at both sides.

The double diaphragm comprises two annular plates 5a, 5b made of rubber or some other suitable elastic material, which are joined to one another, for instance by gluing, at their outer circumference at 9 and open out increasingly toward the interior in terms of their spacing from one another and with their inner periphery are curved outward, that is, in the axial direction of the intake tube or of the grid tube supporting them, thereby forming cylindrical partial end zones 10—10, with which the two elastic annular plates 5a, 5b can be secured to the grid tube section 8, for instance being firmly clamped with the aid of hose clamps.

From FIG. 2 it is also apparent that the volume added to the interior volume of the intake tube by means of the double diaphragm 5 is relatively small; however, this is not important, for the double diaphragm or generally the diaphragm means are intended to assure only that an uncoupling with respect to the air flow rate meter should take place by means causing the pressure shocks or pressure waves to reach the atmosphere from this point, or in other words to transmit their energy via the double diaphragm to the surroundings. The elastic annular plates at both sides are made of relatively thin-walled material, and because of the design shown in FIG. 2 they retain their shape.

The unexpected effect of the disposition of the double diaphragm upon intake tube fluctuation conditions can now be appreciated from the diagrams in FIGS. 4–7, taken in conjunction with FIG. 3, which show the result of measurements performed.

Figure 5:
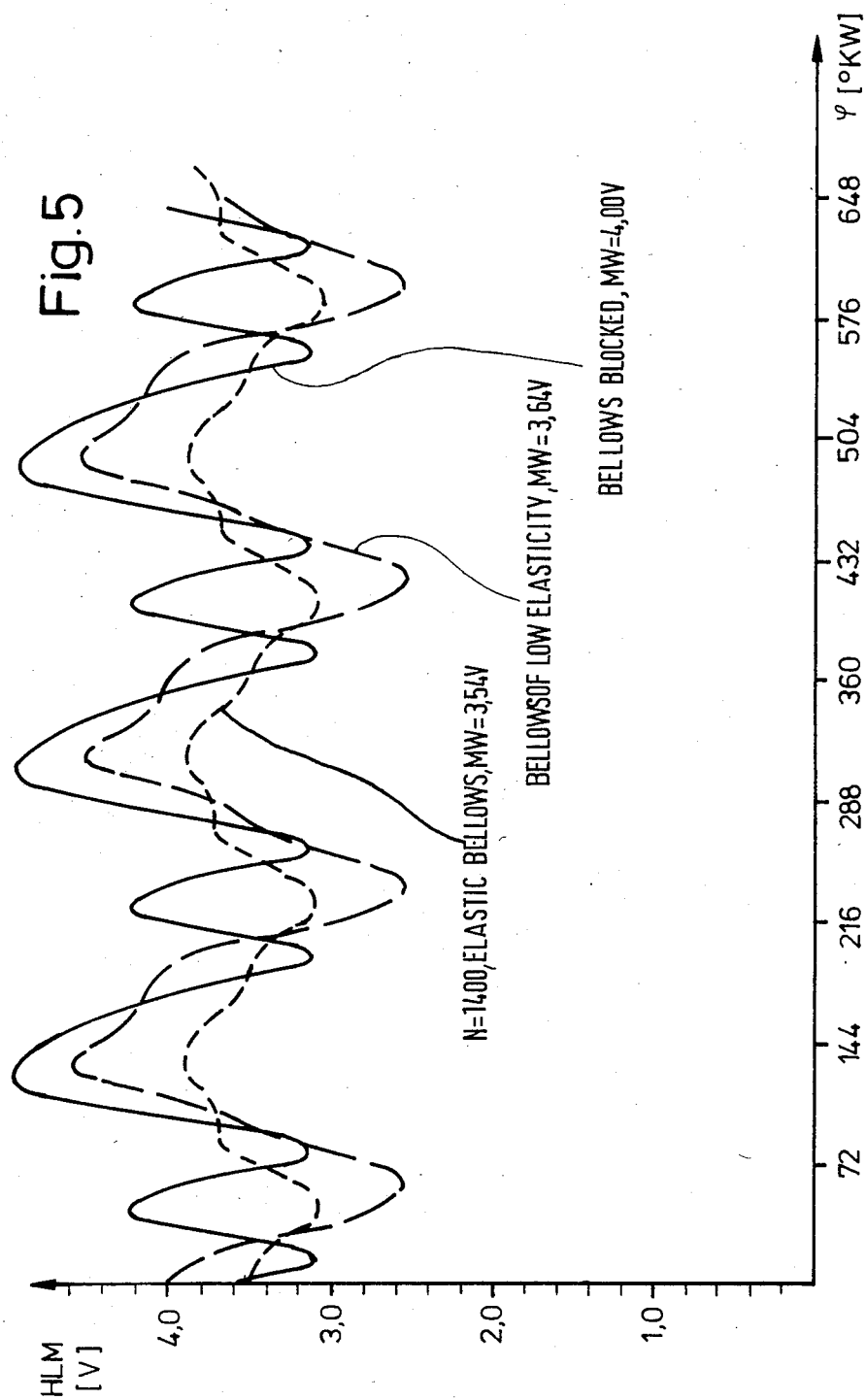

The diagrammed courses in FIGS. 4–7 each, except for FIG. 5, show two different curves, representing the electric output voltages of the hot wire air flow rate meter used, which for the sake of numerical orientation can be said to be between approximately 2 and 5 volts. The hot wire signal course HLM has a pronounced periodicity over the crankshaft angle, and measurements are performed at crankshaft angles between 0 and 720°. In the diagrams, the hot wire signal HLM is indicated as a mean value MW, for the indicated rpm, when there is an elastic bellows in the form, here, of the exemplary embodiment of FIG. 2 (that is, a double diaphragm), and when the bellows is blocked. It is apparent that in the presence of the elastic bellows, the forceful oscillations appear notably calmed, and furthermore in the illustrated exemplary embodiment and the measurement designed as shown, the various mean values of the hot wire signal HLM differ only relatively slightly in the various diagrams of FIGS. 4, 6 and 7; that is, practically the same curve course is obtained at n/m = 1000, 2000 and 3000. The mean values are markedly different, however, if the measurements are performed in accordance with FIG. 5, and a measurement at an rpm of n = 1400 min$^{-1}$, with one elastic bellows, one bellows that is somewhat less elastic, and a blocked bellows (or double diaphragm). It can be seen that aside from the quite different curve shapes of the individual hot wire signal courses, the mean value with a blocked bellows is at 4 volts, in terms of numerical values, while if the elastic bellows is provided a mean value of 3.54 volts can be measured.

If the measured values are entered in the diagram of FIG. 3, then it is clear that with a blocked bellows, that is, in previously conventional forms of operation with a hot wire air flow rate meter, and at specific engine rpm values and at corresponding air column fluctuation frequencies, here in the range between 1000 and approximately 1700 min$^{-1}$, the error in hot wire measurement that is inherent in the system becomes notably apparent (solid line), while the dashed curve of FIG. 3 equally clearly shows the decisive improvement and correction of the hot wire output signal over the rpm.

It also becomes apparent that the disposition of the uncoupling chamber, here realized by an elastic double diaphragm, before the air flow rate meter leads overal to a correction and therefore an improvement in measurement results because of the calming of the signal course.

Naturally the invention is not limited to double diaphragm systems but can instead be realized by arbitrary systems providing a practically atmospheric condition in a given area of an intake tube. The further exemplary embodiment of the present invention shown in FIG. 8 clearly shows that any elastic system receiving pressure waves from the intake tube and transmitting them in their effects to the surroundings (the atmosphere) may suitably be successfully used in the sense of the invention.

Figure 8:
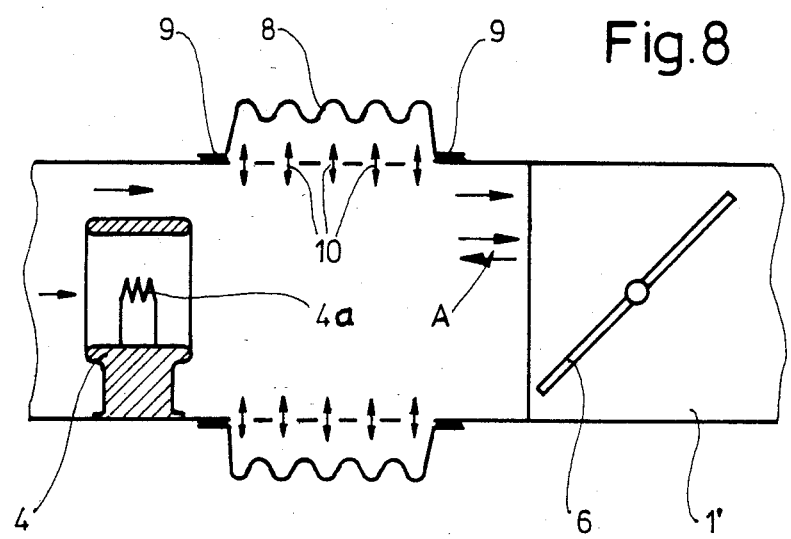
FIG. 8 additionally shows a further exemplary embodiment of a pressure wave blocking diaphragm in the form of an axial corrugated tube.

In the exemplary embodiment of FIG. 8, elastic diaphragm means 8 joined to the intake tube 1' between the throttle valve 6 and the air flow rate meter 4 are used, which in this case are cylindrical/tubular in embodiment and have the nature of hose of corrugated material; they surround the outside of the intake tube, spaced slightly apart therefrom, being fastened there by suitable means (gluing, clamping such as hose clamps at 9). The corrugated tube 8, as it will be called henceforth, has an axial main extension direction and can also be flush with the surface of the intake tube or if needed also be disposed inside the intake tube; that is unimportant, as is the question of whether there are especially embodied corrugated tube areas or whether the corrugated tube even has the pronounced corrugated tube characteristic shown in FIG. 8 at all. What is essential remains only that the elastic material of the diaphragm system is capable of uncoupling the portion of the intake tube that contains the air flow rate meter 4 from the actual intake tube, in terms of fluctuations in the air flow rate, so that the oscillations or fluctuations existing in the intake tube cannot reach the air flow rate meter.

The specialized embodiment shown in FIG. 8 is designed such that in the vicinity of the compensating corrugated tube 8, either the intake tube has perforations 10, which enable the corrugated tube 8 to be associated with or connected to it (the small double arrows are intended to more clearly show the pressure equalizing mechanism effected by means of the corrugated tube 8), or else in the vicinity the intake tube is replaced by a separate grid tube section. However, if the rigidity of the intake tube does not have to be taken into consideration (for instance because the intake tube is retained in a stationary manner at both sides of the area where the partition for the corrugated tube is located), it is also possible to embody the pressure equalizing system solely as a continuation of the intake tube and to dispense entirely with a mechanically continuous intake tube itself. The double fluctuations arising at A in FIG. 8 are in any event dissipated sufficiently enough over the course of the corrugated tube 8 via the double arrows toward the corrugated tube that no further negative effects of the fluctuations arise in the vicinity of the air flow rate meter 4, which is shown in greater detail here in FIG. 8. The air flow rate meter 4 is any case includes a temperature-dependent resistor 4a, which is cooled by the action of the air mass flowing past it, and in the final analysis it is by this effect that the quantity of air flowing through the intake tube is detected.

All the characteristics found in the description, recited in the ensuing claims or shown in the drawing may be essential to the invention, whether taken singly or in any arbitary combination with one another.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A method for shielding an air flow rate meter operating with a temperature-dependent resistor disposed in a section within an intake tube of an internal combustion engine from air column fluctuations arising due to non-uniform aspiration action of the engine, comprising the steps of positioning an elastic diaphragm means in a section in said intake tube downstream of said flow rate meter and sealing said elastic diaphragm means to form a chamber which provides a virtually constant pressure.

2. A method as defined by claim 1, comprising the further step of positioning said elastic diaphragm means in said intake tube between said flow rate meter and a throttle valve.

3. A method as defined by claim 1, comprising the further step of providing means defining apertures in a predetermined zone in said intake tube and thereafter sealingly positioning said elastic diaphragm means about said zone.

4. A method as defined by claim 3, comprising the further step of forming the means defining apertures in said intake tube in the form of a grid and thereafter sealingly positioning said elastic diaphragm means about said grid zone.

5. A method as defined by claim 1, further wherein the diaphragm walls of the constant-pressure chamber are joined to the intake tube for intercepting pressure waves consisting of air mass fluctuations which arrive from the inlet valve area of the intake tube, whereupon said pressure waves are conducted away to the surrounding outside atmosphere so that a region adjacent the air flow rate meter is substantially insulated from the air mass fluctuations in the intake tube.

6. In an apparatus for shielding an air flow rate meter operating with a temperature-dependent resistor disposed in the intake tube of an internal combustion engine from air column fluctuations arising from the non-uniform aspiration action of the engine, the improvement comprising an elastic diaphragm means joined to a section of an intake tube downstream of said air flow rate meter, whereby a virtually constant atmospheric pressure in the interior of said intake tube is maintained, said elastic diaphragm means being secured via axial end portions on the outside of an associated circumferential area of said intake tube, said associated circumferential area of said intake tube being provided in the form of a grid tube.

7. An apparatus as defined by claim 6, further comprising said elastic diaphragm means comprises two opposed annular disks made of an elastic material, which are joined to one another at a circumferential extent which annular disks flare apart therefrom to a collar secured to said intake tube.

8. An apparatus as defined by claim 6, further comprising said diaphragm means comprises a corrugated tube having a predetermined length joined to a section in said intake tube.

9. An apparatus as defined by claim 8, further comprising said corrugated hose surrounds said section in said intake tube, and said section has a perforated zone which zone extends at least partially through said corrugated tube, and at a predetermined distance therefrom, whereby to form a slight additional intake tube volume.

10. In an apparatus for shielding an air flow rate meter operating with a temperature-dependent resistor disposed in the intake tube of an internal combustion engine from air column fluctuations arising from the non-uniform aspiration action of the engine, the improvement comprising an elastic diaphragm means joined to a section of an intake tube downstream of said air flow rate meter, said elastic diaphragm means including at least partial wall areas comprised of a material so elastically yieldable that an area in which the air flow rate meter is disposed is substantially insulated from air mass fluctuations in the intake tube, the elastic diaphragm means being secured via axial end portions on the outside of an associated circumferential area of said intake tube, said associated circumferential area of the intake tube being provided in the form of a perforated grid tube having substantially the diameter of said intake tube.

11. An apparatus as defined by claim 10, further comprising said diaphragm means comprises a corrugated tube having a predetermined length joined to a section in said intake tube.

12. In an apparatus for shielding an air flow rate meter operating with a temperature-dependent resistor disposed in the intake tube of an internal combustion engine from air column fluctuations arising from the non-uniform aspiration action of the engine, the improvement comprising an elastic diaphragm means joined to a section of an intake tube downstream of said air flow rate meter, said elastic diaphragm means comprising two opposed annular disks made of an elastic material, which are joined to one another at at circumferential extent, which disk means flare apart therefrom to a collar secured to said intake tube.

13. An apparatus as defined by claim 12, further comprising inner annular peripheral zones of each annular disk are bent in opposite directions to form said collar and extend axially with respect to the intake tube and are secured on an inner grid tube serving as a supporting element.

14. An apparatus as defined by claim 12, further comprising the annular disks have faces sealed together at a circumferential rim and said collars are firmly clamped to said supporting grid tube.

15. An apparatus as defined by claim 12, further comprising said diaphragm means comprises a corrugated tube having a predetermined length joined to a section in said intake tube.

* * * * *